June 17, 1952 F. WHITTLE 2,601,194
MULTIUNIT GAS TURBINE POWER PLANT FOR AIRCRAFT PROPULSION
Filed Nov. 15, 1945 3 Sheets-Sheet 1

Inventor.
Frank Whittle
By Stevens and Davis
his Attnys

June 17, 1952  F. WHITTLE  2,601,194
MULTIUNIT GAS TURBINE POWER PLANT FOR AIRCRAFT PROPULSION
Filed Nov. 15, 1945  3 Sheets-Sheet 3
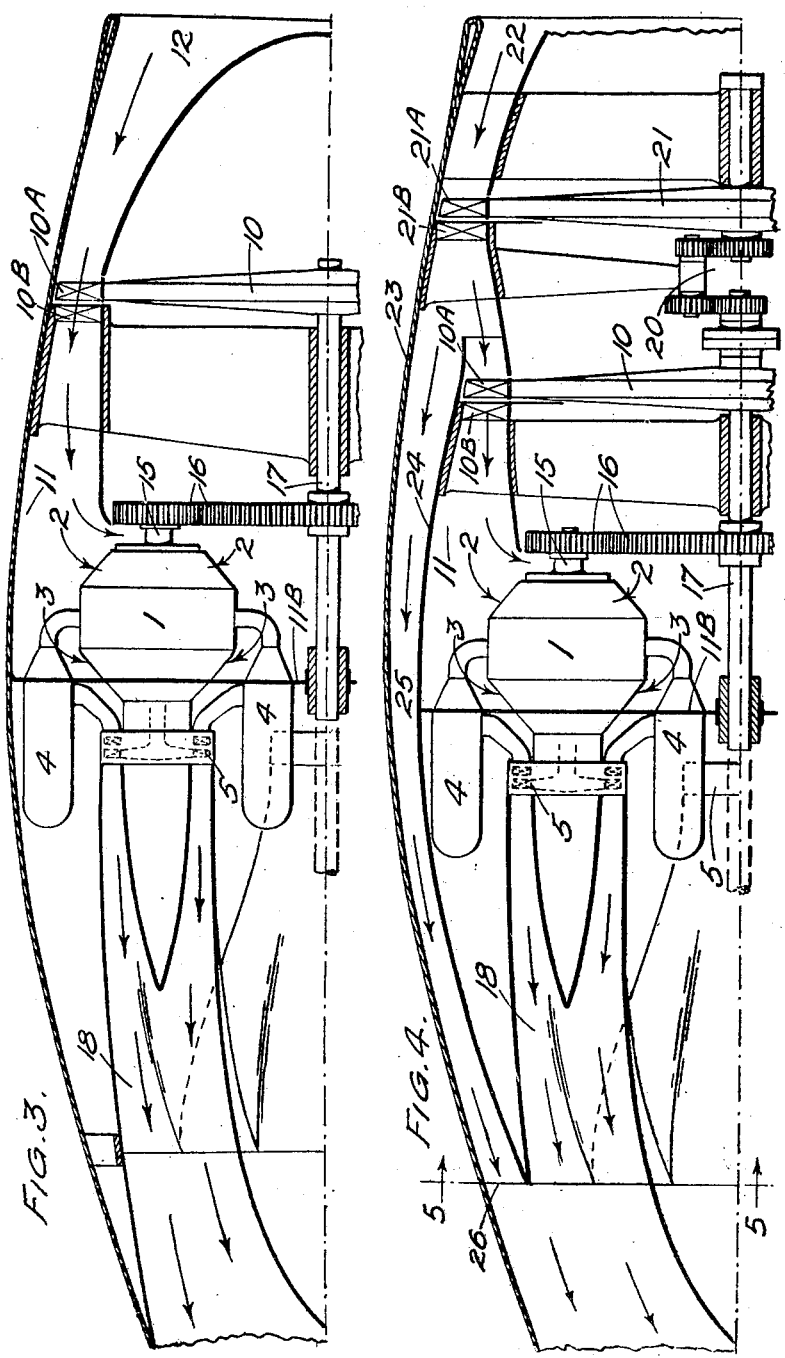
Inventor
Frank Whittle
By Stevens and Davis
his Attnys Patented June 17, 1952

2,601,194

UNITED STATES PATENT OFFICE 2,601,194

MULTIUNIT GAS TURBINE POWER PLANT FOR AIRCRAFT PROPULSION

Frank Whittle, Harrow-on-the-Hill, Middlesex, England, assignor to Power Jets (Research & Development) Limited, London, England Application November 15, 1945, Serial No. 628,800
In Great Britain December 1, 1941

Section 1, Public Law 690, August 8, 1946
Patent expires December 1, 1961

12 Claims. (Cl. 60—35.6)

This invention relates to power plants. Primarily, but not exclusively, the invention is concerned with a power plant for aircraft, and is intended to be used to provide a plant which will produce a flow of energized gas for the propulsion of aircraft by jet reaction, and/or, for the driving of a gas turbine delivering useful shaft power (which may again be used through compressor or screw means for propulsion purposes), or for other purposes.

As a propulsion plant for aircraft the invention offers advantages of comparative lightness, compactness, and simplicity for a given output. A main object of the invention is to provide for a large power output from one plant by the use therein of a plurality of individual power units, with a view to avoiding the adverse factors involved in the mere scaling up of the size of any one power unit, whereby weight may be minimized and standardized power units may be used which can be economically built and developed by reason of comparatively small unit size. A further object is to provide a power plant, the arrangement of which lends itself favorably to various working arrangements or "cycles of operation" for example that which is described in U. S. Patent No. 2,168,726. The present invention is also adaptable to be designed for propulsion partly by airscrew or ducted airscrew or propeller. Secondary advantages also arise; for example the failure of one power unit may not put the power plant out of action or disproportionately diminish its utility. The plant may be so contrived that externally transmitted gyroscopic forces may largely be suppressed. Fuel supply and control systems may be simplified and provided at a lower cost in weight and working parts.

The basis of the invention is the provision of a power plant embodying a plurality of individual power units through which air passes each power unit constituting a self-contained gas turbine unit comprising a compressor supplying air by way of heating means to a turbine which in turn drives the compressor. These power units are supplied with air in common from a single rotary compressor about whose axis they are arranged in circular symmetry.

It is at present preferred that the whole useful power output of the plant is in the form of a propulsive jet; this, however, does not exclude the possibility of useful power output being taken out as shaft power to drive, for example, a conventional airscrew operating in the open, or as shaft power for other purposes. It may be preferable in some installations to permit the leaving gases to be emitted through a plurality of propulsive jets rather than ducting them all through one jet. The invention includes the provision of a power plant, as briefly stated above, combined with an aircraft nacelle so constituted as to include the plant and the air ducting pertaining to the plant as a whole, the nacelle having a forwardly facing air intake opening, and a rearwardly facing opening for the emission of the energized propulsive gases or the passage or duct through which such emission takes place. The invention further includes certain features of arrangement which will be more apparent from the following description.

The accompanying drawings illustrate schematically, layouts of power plant according to the invention.

Figure 3 illustrates an alternative scheme in which the four units are mechanically intergeared; and Figure 4 illustrates a further scheme in which not only are the four units supercharged, but there is also a ducted fan which precompresses the air intake of the supercharger and also energizes a propulsive air blast.

For the purposes of description it is assumed that each power unit comprises, as in my U. S. Patent 2,404,334, a double-sided centrifugal compressor 1, with front and rear air entry, indicated generally at 2 and 3, a combustion system 4 through which the whole air output of the compressor 1 is passed and heated by the burning of fuel therein, a gas turbine at 5 which is directly coupled so that its shaft power drives the compressor 1 is passed and heated by the burning of haust duct 6 through which the whole of the leaving gases from the turbine 5 is ejected. Each unit is assumed to have its own auxiliaries, such as oil pumps, fuel pumps, starter motor, and so on.

Figure 1:
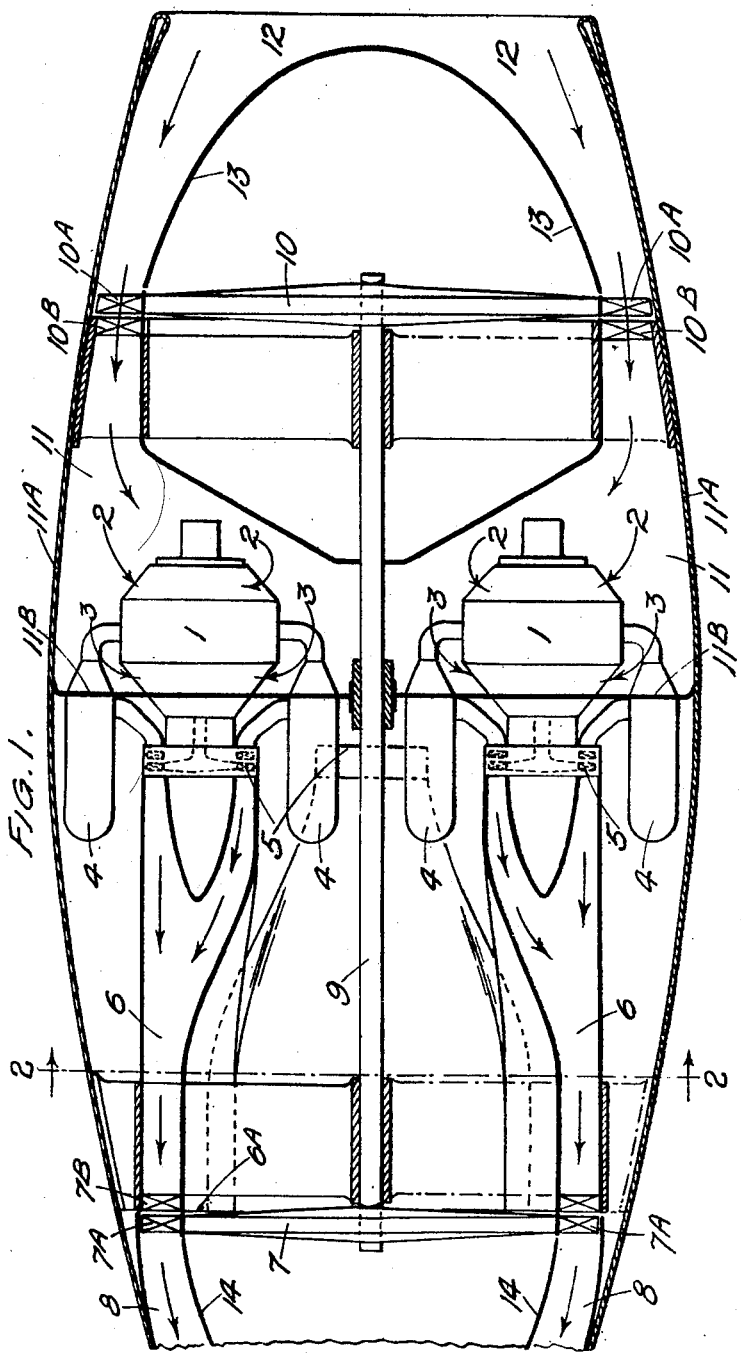
Figure 1 illustrates a form in which four mechanically independent power units mutually drive a gas turbine, the shaft power output of which drives a compressor which supercharges all four units.

Referring to Figure 1, the power plant comprises four power units each as briefly described above, arranged with their rotor axes parallel to the main fore-and-aft axis of the plant which is also the axis of a final gas turbine shown at 7 having moving blades 7A, nozzle blading 7B and shaft 9, and shown by way of example as a single-row axial flow turbine. Each power unit 1 has its exhaust duct 6 so formed that it terminates in a segmental or part-annular shape at 6A (Figure 2) corresponding approximately to a quarter of the nozzle ring which it feeds. Thus the four units runing together, afford a continuous entry type of admission to the turbine 7. The gases leaving the turbine 7 are confined in the final exhaust duct 8 which opens to atmosphere as a propulsion jet.

The turbine 7 and a compressor 10 driven thereby together constitute an energy-converter which receives energy from the gases flowing through the exhaust duct 6, converts this into mechanical energy, rotating the shaft 9, and then reconverts this into energy imparted to the air coming in by the intake at 12. For this purpose the shaft 9 suitably borne on the main axis, extends forwardly to the front part of the plant, and at its forward end carries the impeller of the compressor 10 which, as illustrated, by way of example, is a single-row axial compressor with moving blades 10A, and stator blading 10B. Here again is wide scope for selection, since the type of compressor used may evidently be varied according to practical requirement. This compressor discharges into a chamber 11 with a wall 11A extending around the intakes of all the units and suitably sealed around appropriate joints in the plane of a bulkhead or partition 11B, preferably so as to exclude from the chamber 11 the whole or the greater part of the combustion sets 4 and other high-temperature regions of the units. The compressor 10 in maintaining an elevated pressure in the chamber 11, supercharges all four power units. Its intake is from atmosphere, and is intended to be such as to exploit whatever Pitot head may be available as a result of relative air velocity. Apart from any trivial power requirements of oil pumps, etc., the whole shaft power of the turbine 7 is absorbed by the compressor 10. Only this arrangement is, in effect, a concept similar to the known exhaust-driven turbo-supercharger as applied to areo engines of orthodox type.

It will be noted that there is no mechanical driving connection between the units in the case of Figure 1. Thus the possibility exists (subject to certain difficulties which may arise in connection with temperature differences and other mechanical and thermal matters) of being able to operate with one or more of the units shut down.

The exhaust ducting 6 from each unit, may as shown supply a corresponding arc of the nozzle ring: or the ducts may be united in a continuous annular nozzle box well upstream from the nozzle blading, so that some degree of pressure balance will occur and consequently uniformity of distribution at entry to the turbine will be enhanced. All the incoming air flows through the turbine blading, 10A and 10B and then divides into separate streams through the separate compressors 1; the exhaust gas from all the turbines 5 passes through the turbine 7.

The units may be constructed so as to run in opposite sense of rotation in pairs, so as to suppress undesired gyroscopic forces of the whole plant.

The wall 11A preferably partly constitutes also, part of the skin of an aircraft nacelle in which the plant as a whole is contained. This nacelle has a forwardly facing air intake at 12, and its rear end has an opening which either forms the final propulsion nozzle or gives passage for it. Suitable fairings, such as those shown at 13 and 14, fair the front of the compressor 10 and rear of the disc of the turbine 7, to produce as far as possible non-turbulent flow and to define, according to design, any chosen cross-sectional areas of the annular ducts which surround them.

Turning now to Figure 3, a variant is schematically shown, in which the plant comprises four units as before (and consequently not described again) but the final gas turbine is omitted, the shafts 15 of the units being mechanically mutually geared, as indicated at 16, to a central shaft 17 suitably borne, which shaft drives the supercharger compressor 10 provided as in Figure 1. Thus the energy converter is now constituted by gearing 16 and compressor 10, and converts some of the mechanical energy of rotation of the turbines 5 into energy imparted to the incoming air. In this case it will be observed that all four units will rotate together, and being positively inter-geared it is not intended that provision be made to accommodate stopping of individual units. The exhaust from each unit is led, by ducts 18, into a single rearwardly extending duct terminating in a propulsion nozzle.

Figure 4 illustrates an elaboration of the scheme of Figure 3. Parts already described in relation to Figure 3 are shown with the same references. In this case the shaft 17 not only drives the compressor 10 but, further forward again, and through mechanical gearing indicated at 20, drives a further compressor 21 with moving blading 21A and stator blading 21B. This compressor 21 receives atmospheric air through the forwardly facing air entry 22, and compresses it within the outer skin 23 of a nacelle, the interior of which forms, as it were, a pressurised chamber. The nacelle contains the whole power plant as schemed in Figure 3, including the compartment formed by the skin 24 which is fed by the compressor 10. Consequently the compressor 10 is fed with air which is already compressed to some extent, so the compressor 21 constitutes, in effect, a first stage supercharger. The compressor 21, however, is designed to deliver a considerably greater mass flow than is required by the four units, and the balance or remainder of its delivery by-passes the compressor 10 and the units, and flows rearwardly through an annular duct or space 25 between the skins 23, 24, until it joins with the exhaust gases from the units (in the region 26) to form part of the propulsive stream. The design of the components and the cross-sectional area of the ducting are so arranged as to allow the air from 25 and the exhaust gases from 18, to mingle with the minimum of turbulent loss. The compressor 21 is seen to be in the nature of a ducted fan or airscrew.

Figure 2:
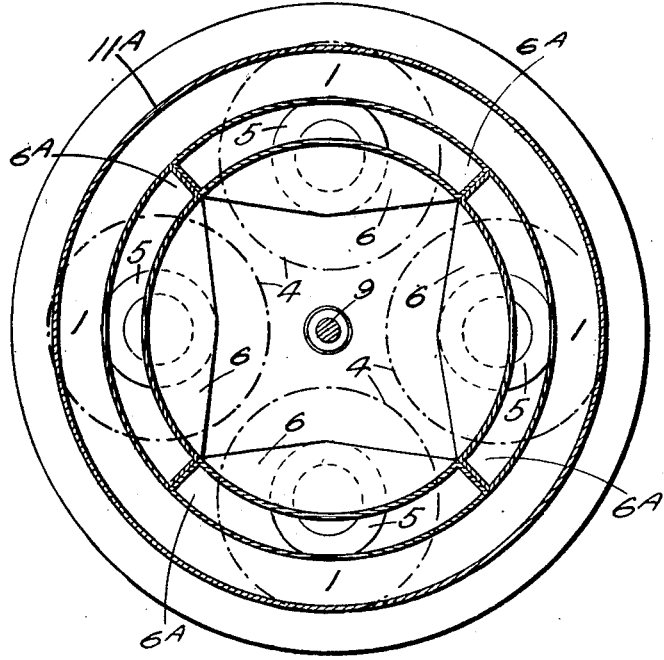
Figure 2 is a sectional view on the line 2—2 of Figure 1.
Figure 5:
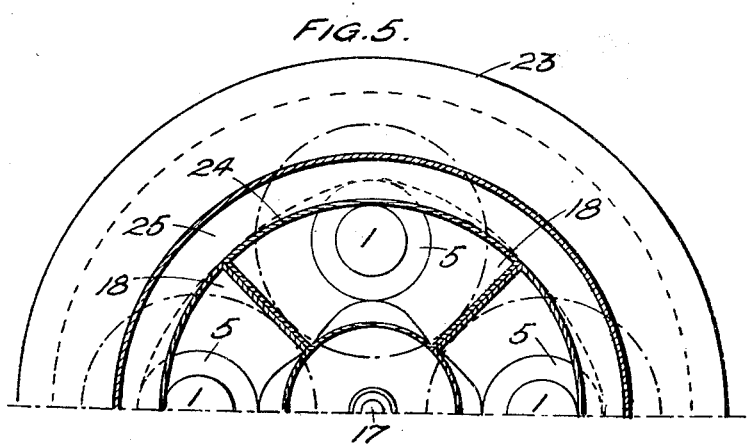
Figure 5 is a sectional view on line 5—5 of Figure 4.

Figure 5 is a view similar to Figure 2, but showing the different arrangement of the exhaust ducting which arises in Figures 4. Whilst for clarity of drawing, the impression has been given that the symmetrical arrangement of units is (as indicated in Figures 2 and 5) with units at top and bottom and the two sides, it is more probable in practice, having regard to necessary aircraft structure, that the units will be disposed in the manner apparent if these figures are twisted 45° around the main axis; that is to say, as a square pattern with the sides of the square vertical and horizontal. This may be especially the case if a complete power plant is to be installed in the wing of an aircraft.

I claim:

1. Aircraft jet propulsion power plant comprising a nacelle having a forwardly facing air entry and rearwardly facing gas exit in relation to the intended direction of flight, a compressor in the entry for pressurizing the nacelle, a plurality of self-contained gas turbine power units arranged in circular symmetry about the axis of the compressor, each unit comprising a turbine, a compressor driven thereby and heating means connected to receive air from the compressor of the unit and to supply hot gas to the turbine of the unit, said power units being wholly enclosed by the nacelle so as to receive their entire air supply therefrom, and means receiving power from the power units in common for driving the first said compressor.

2. Aircraft jet propulsion power plant comprising a nacelle having a forwardly facing air entry and rearwardly facing gas exit in relation to the intended direction of flight, a bulkhead for dividing the nacelle into two chambers, a first compressor in the entry for pressurizing the first of said chambers, a plurality of self-contained gas turbine power units arranged in circular symmetry about the axis of said compressor, each unit comprising a turbine, a compressor driven thereby and heating means in the second of said chambers connected to receive air from the compressor of the unit and to supply hot gas to the turbine of the unit, said power units being wholly enclosed by the nacelle so as to receive their entire air supply from the pressurized chamber, and means receiving power from said units in common for driving the first said compressor.

3. Aircraft jet propulsion power plant comprising a nacelle having a forwardly facing air entry and rearwardly facing gas exit in relation to the intended direction of flight, an overall compressor in the entry for pressurizing the nacelle, a plurality of self-contained gas turbine power units arranged in circular symmetry about the axis of the first compressor, each unit comprising a turbine, a compressor driven thereby and heating means connected to receive air from the compressor of the unit and to supply hot gas to the turbine of the unit, said power units being wholly enclosed by the nacelle so as to receive their entire air supply therefrom, exhaust ducting from the power units arranged to terminate in a virtually continuous annulus, turbine nozzle blading mounted to correspond with the annulus, an overall gas turbine corresponding to the blading for actuation by the exhaust products of the power units in common, and shaft power-transmitting means for coupling the overall turbine and overall compressor.

4. Aircraft jet propulsion power plant comprising a nacelle having a forwardly facing air entry and rearwardly facing gas exit in relation to the intended direction of flight, a bulkhead for dividing the nacelle into two chambers, a compressor in the entry for pressurizing the first of said chambers, a plurality of self-contained gas turbine power units arranged in circular symmetry about the axis of the compressor, each unit comprising a turbine, a compressor driven thereby and heating means in the second of said chambers connected to receive air from the compressor of the unit and to supply hot gas to the turbine of the unit, said power units being wholly enclosed by the nacelle and adapted to receive their entire air supply from the pressurized chamber, exhaust ducting from the power units arranged to terminate in a virtually continuous annulus, turbine nozzle blading mounted to correspond with the annulus, a gas turbine corresponding to the said nozzle blading for actuation by the exhaust products of the power units in common, and shaft power transmitting means for coupling the last said turbine to the first said compressor.

5. Aircraft jet propulsion power plant comprising a nacelle having a forwardly facing air entry and rearwardly facing gas exit in relation to the intended direction of flight, a main compressor in the entry for pressurizing the nacelle, a plurality of self-contained gas turbine power units arranged with their axes parallel to, and in circular symmetry about, the axis of the main compressor, each unit comprising a turbine, a compressor driven thereby and heating means connected to receive air from the compressor of the unit and to supply hot gas to the turbine of the unit, said power units being wholly enclosed by the nacelle so as to receive their entire air supply therefrom, and means receiving power from the units in common for driving the said main compressor.

6. Aircraft jet propulsion power plant comprising a nacelle having a forwardly facing air entry and rearwardly facing gas exit in relation to the intended direction of flight, a bulkhead for dividing the nacelle into two chambers, a main compressor in the entry for pressurizing the first of said chambers, a plurality of self-contained gas turbine power units arranged with their axes parallel to and in circular symmetry about the axis of the main compressor, each unit comprising a turbine, a compressor driven thereby and heating means in the second of said chambers connected to receive air from the compressor of the unit and to supply hot gas to the turbine of the unit, said power units being wholly enclosed by said nacelle and adapted to receive all the air supplied to the pressurized chamber, exhaust ducting from the power units arranged to terminate in a virtually continuous annulus, turbine nozzle blading mounted to correspond with the annulus, a further gas turbine corresponding to the blading for actuation by the exhaust products of the power units in common, and shaft power transmitting means for coupling the said further turbine and the main compressor.

7. Aircraft jet propulsion power plant comprising a nacelle having a forwardly facing air entry and rearwardly facing gas exit in relation to the intended direction of flight, a compressor in the entry for pressurizing the nacelle, a plurality of self-contained gas turbine power units, each unit comprising a turbine, a compressor driven thereby and heating means connected to receive air from the compressor of the unit and to supply hot gas to the turbine of the unit, said power units being wholly enclosed by the nacelle so as to receive their entire air supply therefrom, the units being arranged in circular symmetry about the axis of the compressor, the first said compressor having a diameter at least as large as the diameter of the circle of symmetry of the units, and means receiving power from the units in common for driving the first said compressor.

8. Aircraft jet propulsion power plant comprising a nacelle having a forwardly facing air entry and rearwardly facing gas exit in relation to the intended direction of flight, a bulkhead for dividing the nacelle into two chambers, a main compressor in the entry for pressurizing the first of said chambers, a plurality of self-contained gas turbine power units arranged in circular symmetry about the axis of the main compressor, which has a diameter at least as large as the diameter of the circle of symmetry of the units, each unit comprising a turbine, a compressor driven thereby and heating means in the second of said chambers connected to receive air from the compressor of the unit and to supply hot gas to the turbine of the unit, said power units being wholly enclosed by the nacelle and adapted to receive their entire air supply from the pressurized chamber, and means receiving power from the units in common for driving the said main compressor.

9. Aircraft jet propulsion power plant comprising a nacelle having a forwardly facing air entry and rearwardly facing gas exit in relation to the intended direction of flight, a main compressor in the entry for pressurizing the nacelle, a plurality of self-contained gas turbine power units arranged in circular symmetry about the axis of the main compressor, which has a diameter at least as large as the diameter of the circle of symmetry of said units, each unit comprising a turbine, a compressor driven thereby and heating means connected to receive air from the compressor of the unit and to supply hot gas to the turbine of the unit, said power units being wholly enclosed by the nacelle so as to receive their entire air supply therefrom, exhaust ducting from said power units arranged to terminate in a virtually continuous annulus, turbine nozzle blading mounted to correspond with the annulus, a further gas turbine corresponding to the blading, having a diameter at least as large as the diameter of the circle of symmetry of the units, for actuation by the exhaust products of the power units in common, and shaft power transmitting means coupling the said further turbine to the said main compressor.

10. Aircraft jet propulsion power plant comprising a nacelle having a forwardly facing air entry and rearwardly facing gas exit in relation to the intended direction of flight, a bulkhead for dividing the nacelle into two chambers, a main compressor in said entry for pressurizing the first of said chambers, a plurality of self-contained gas turbine power units arranged in circular symmetry about the axis of the main compressor, which has a diameter at least as large as the diameter of the circle of symmetry of said units, each unit comprising a turbine, a compressor driven thereby and heating means in the second of said chambers, connected to receive air from the compressor of the unit and to supply hot gas to the turbine of the unit, said power units being wholly enclosed by the nacelle and adapted to receive their entire air supply from the pressurized chamber, exhaust ducting from said power units arranged to terminate in a virtually continuous annulus, turbine nozzle blading mounted to correspond with the annulus, a further gas turbine corresponding to the blading, having a diameter at least as large as the diameter of the circle of symmetry of the units, for actuation by the exhaust products of the power units in common, and shaft power transmitting means coupling the said further turbine to the said main compressor.

11. Aircraft jet propulsion power plant comprising a nacelle having a forwardly facing air entry and a rearwardly facing gas exit in relation to the intended direction of flight, a bulkhead for dividing the nacelle into two chambers, a main compressor in the entry for pressurizing the first of said chambers, a plurality of self-contained gas turbine power units, each unit comprising a turbine, a compressor driven thereby and heating means in the second of said chambers, connected to receive air from the compressor of the unit and to supply hot gas to the turbine of the unit, said power units being wholly enclosed by the nacelle and located so as to receive their entire air supply from the pressurized chamber, a streamline shell having a forward air entry and rearward air exit external to and defining annular duct means around the nacelle, a ducted fan in the shell air entry whose output in part supercharges the said main compressor and in part provides propulsion force through the annular duct, and means receiving power from the power units in common for driving the said main compressor and ducted fan.

12. Aircraft propulsion power plant in which, when it is in operation, the propulsive energy is derived from the gases under pressure supplied by a plurality of self-contained gas-generators, this power plant consisting of a plurality of gas generators as aforesaid disposed symmetrically about a central axis extending in the intended direction of flight, each of these gas generators consisting of a compressor, a gas turbine in driving relationship with said compressor, a gas supply connection extending from said compressor to said turbine and gas heating means in said supply connection, in combination with a rotary shaft extending along said central axis, an overall gas turbine mounted on said shaft, and a casing about said gas generators and said overall gas turbine, said casing extending in the intended direction of flight and defining a gas path made up of separate branches through said gas generators and a common stream through said overall gas turbine.

FRANK WHITTLE.

REFERENCES CITED

The following references are of record in the file of this patent:

UNITED STATES PATENTS

| Number | Name | Date |
|---|---|---|
| 1,329,480 | Sherbondy | Feb. 3, 1920 |
| 1,986,435 | Heinze | Jan. 1, 1935 |
| 2,073,191 | Belluzzo | Mar. 9, 1937 |
| 2,237,082 | Pescara | Apr. 1, 1941 |
| 2,292,288 | Pescara | Aug. 4, 1942 |
| 2,396,911 | Anxionnaz et al. | Mar. 19, 1946 |

FOREIGN PATENTS

| Number | Country | Date |
|---|---|---|
| 565,359 | Germany | Aug. 31, 1933 |
| 347,206 | Great Britain | Apr. 16, 1931 |
| 547,711 | Great Britain | Sept. 8, 1942 |
| 213,169 | Switzerland | Apr. 16, 1941 |
| 215,477 | Switzerland | Sept. 16, 1941 |